Figure 1:
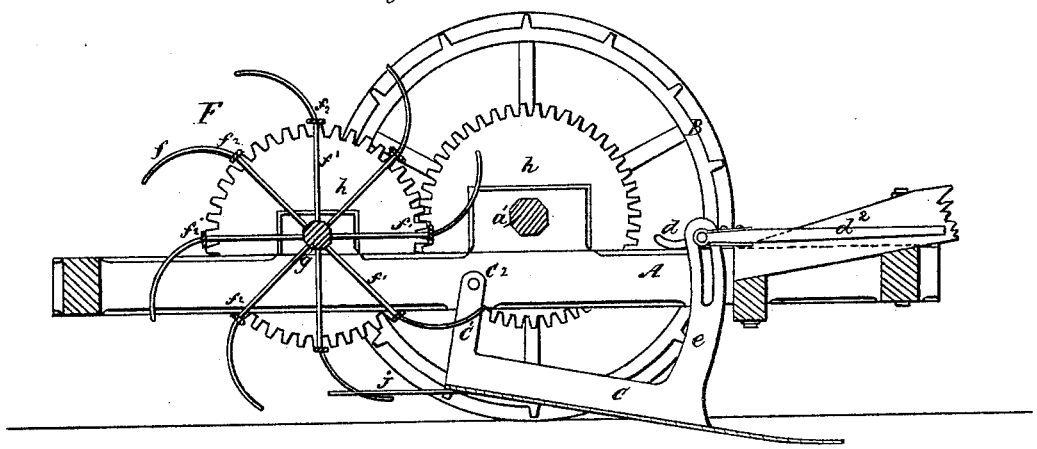
Figure 2:
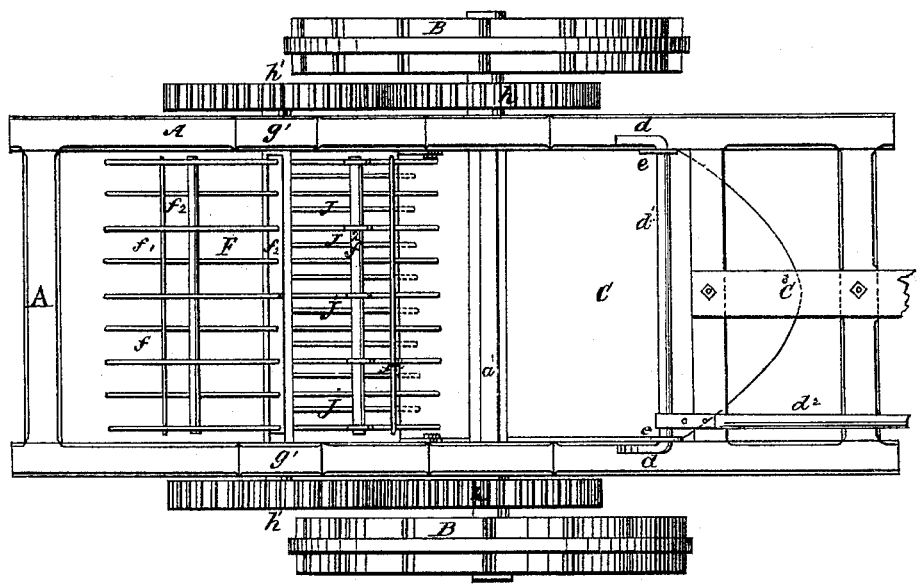

P. SISSON.
Potato Digger.

No. 63,659. Patented Apr. 9, 1867.

Witnesses:
Francis Wood
F A Langworthy

Inventor:
Philander Sisson

United States Patent Office.

PHILANDER SISSON, OF BRANT, NEW YORK.

Letters Patent No. 63,659, dated April 9, 1867.

---

IMPROVEMENT IN POTATO DIGGER.

---

*The Schedule referred to in these Letters Patent and making part of the same.*

---

TO ALL WHOM IT MAY CONCERN:

Be it known that I, PHILANDER SISSON, of Brant, in the county of Erie, and State of New York, have invented a new and improved Potato Digger; and I do hereby declare that the following is a full and exact description thereof, reference being had to the accompanying drawings, making a part of this specification, in which—

Figure I is a longitudinal vertical section.

Figure II is a top plan view.

The nature of this invention consists in the particular construction and arrangement of the platform and revolving reel relatively to each other and the axle of the driving-wheels as hereinafter described.

Letters of like name and kind refer to like parts in each of the figures.

A represents the main frame of the machine, upon which all the operating parts are supported. It is rectangular and oblong, and has appropriate bearings for the axle $a'$. B B are the driving-wheels, one upon each side of the frame, which are placed loose upon the axle and provided with proper clutch arrangement for the purpose of transmitting motion to the axle when the machine is going ahead. C represents a platform, the rear end of which is hinged by means of the arms $c^1$, to the side beams of the frame, as shown at $c^2$. It has a sharp cutting edge formed in front and forward of the axle, which projects in the centre, as shown at $c^3$, Fig. II. This is for the purpose of producing a slanting or drawing cut into the earth. The front edge may be raised and lowered by means of the cam, $d$ and hand-lever $d^2$ upon the top of the side beams of the frame. There are two vertical bars $e$ connected to the platform, which project upwardly above the frame A, and are suspended upon the cam-shaft $d^1$, extending transversely from one to the other, and passing through slots or holes made in the top of the bars $e$. The cams $d$ are in the shape of a segment of a circle, and firmly attached to or forming part of the cam-shaft $d^1$. They rest upon the side beams of the frame, and thereby prevent the platform from dropping below a certain depth. The hand-lever $d^2$ is made fast to the cam-shaft, so that when the lever is raised the platform will be lifted above the surface of the ground, and the cams are so constructed that they will hold the platform so suspended when the machine is moved from field to field or while it is turned around at the end of a row of hills. F represents a reel located in the rear of the platform C and axle, and composed of a number of rakes $f^1$ arranged radially around the central shaft $g$, which has bearings $g^1$ upon the frame of the machine. This reel is revolved by means of the spur-wheels $h\ h'$, one of which, $h$, is attached to the axle $a'$, and the other, $h'$, to the shaft $g$, so that the revolution of the axle $a'$ gives motion to the reel, though in the opposite or reversed direction. The ends of the teeth of each rake are curved and connected by a flat bar, $f^2$. Every other rake has a double number of prongs for sifting the earth taken up with the potatoes and vines. There are a number of stationary prongs, $j$, attached to the rear end of the platform C, forming an extension thereof, and which project in rear of the axle, which are so arranged that the prongs of the revolving rakes will pass up between those of the stationary rake $j$ and lift all the potatoes, vines, and lumps of earth moved back upon the platform as fast as they alight upon said rake $j$.

The operation of this machine is simple and effective, and may be described as follows: The platform C is dropped to the ground, as shown in Fig. I, so that its front edge will enter below the hills of potatoes and lift them out of the ground. As the machine advances the hills will be moved to the rear end of the platform and on to the stationary rake $j$, and within grasp of the revolving rakes $f^1$. These will then lift up the potatoes, vines, and lumps of earth, sift them and separate them. The earth falls through the reel to the ground, and the vines and potatoes are carried around upon the flat bars $f^2$ and deposited in the rear of the machine. Whenever it is required to back the machine or drive it from field to field, the driver may lift the cutting edge of the platform from the ground and hold it suspended by means of the lever and cams $d\ d^1\ d^2$, as above described.

This machine is cheap of construction and effective in its operation, and accomplishes its work better than any potato digger now in common use.

I am aware that hinged platforms have heretofore been constructed and used in potato diggers. I am also aware that revolving reels have heretofore been used in potato diggers, in combination with hinged platforms. I therefore disclaim such devices broadly.

What I claim as my invention, and desire to secure by Letters Patent, is—

The hinged platform C, having a sharp cutting edge $c^3$ projecting forward of the axle of the driving-wheels, and having stationary rake-teeth $j$ projecting in rear of the axle, in combination with a revolving reel having fingers $f^1$, with flat connecting-bars $f^2$, substantially as described.

PHILANDER SISSON.

Witnesses:
FRANCIS WOOD,
I. A. LANGWORTHY.